United States Patent [19]

Padovani et al.

[11] Patent Number: 5,577,022

[45] Date of Patent: Nov. 19, 1996

[54] PILOT SIGNAL SEARCHING TECHNIQUE FOR A CELLULAR COMMUNICATIONS SYSTEM

[75] Inventors: Roberto Padovani; Walid M. Hamdy, both of San Diego, Calif.; Gil Bar-David, Kullu, India.

[73] Assignee: Qualcomm Incorporated, San Diego, Calif.

[21] Appl. No.: 344,321

[22] Filed: Nov. 22, 1994

[51] Int. Cl.$^6$ .......................... H04B 7/216; H04J 13/02; H04L 27/30

[52] U.S. Cl. .......................... 370/13; 370/18; 375/208; 379/60; 455/33.2; 455/56.1; 455/67.4

[58] Field of Search .......................... 370/13, 17, 18, 370/19, 21, 95.1; 375/200, 205, 206, 208; 379/58, 59, 60; 455/33.1, 33.2, 38.1, 49.1, 53.1, 54.1, 56.1, 67.1, 67.3, 67.4

[56] References Cited

U.S. PATENT DOCUMENTS

| | | | |
|---|---|---|---|
| 5,056,109 | 10/1991 | Gilhousen et al. | 375/205 |
| 5,101,501 | 3/1992 | Gilhousen et al. | 455/33.2 |
| 5,109,390 | 4/1992 | Gilhousen et al. | 375/205 |
| 5,257,283 | 10/1993 | Gilhousen et al. | 375/200 |
| 5,265,119 | 11/1993 | Gilhousen et al. | 375/205 |
| 5,267,261 | 11/1993 | Blakeney, II et al. | 375/205 |
| 5,267,262 | 11/1993 | Wheatley, III | 375/200 |
| 5,420,850 | 5/1995 | Umeda et al. | 370/18 |
| 5,432,843 | 7/1995 | Bonta | 379/60 |

Primary Examiner—Alpus H. Hsu
Attorney, Agent, or Firm—Russell B. Miller; Sean English

[57] ABSTRACT

An improved method and system for performing a pilot signal searching operation in anticipation of handoff in mobile station communication between base stations is disclosed herein. The searching operation is described herein as being implemented within a cellular communication system which uses code division multiple access (CDMA) modulation techniques. The mobile station maintains a list of an Active Set of pilot signals transmitted from base stations with which the mobile station is to communicate through, and a Neighbor Set of pilots from base stations within a predetermined proximity of the mobile station. In addition to the Neighbor and Active Sets of pilots, the mobile station maintains a list of Candidate and Pre-Candidate Sets of pilots. Based on analysis of the signal strength of the pilot signals received at the mobile station, base station entries from the Neighbor Set may be assigned to the Pre-Candidate and Candidate Sets, and eventually to the Active set. The searching operation contemplates comparing pilot signal strength measurements corresponding to each base station entry within the Neighbor Set to a first predetermined level. One or more entries from the Neighbor Set having a base station signal strength measurement greater than the first predetermined level may be placed in the Pre-Candidate Set. The strength of the pilot signals associated with entries in the Pre-Candidate Set are then further evaluated to determine eligibility within the Candidate Set, from which are selected the entries comprising the Active Set.

36 Claims, 7 Drawing Sheets

PILOT SIGNAL SEARCHING TECHNIQUE FOR A CELLULAR COMMUNICATIONS SYSTEM

BACKGROUND OF THE INVENTION

I. Field of the Invention

The present invention relates generally to cellular communications systems in which are disposed multiple base stations, each of which broadcasts a distinguishing pilot signal. More particularly, the present invention relates to a novel and improved technique of searching for and identifying the pilot signals of those base stations from which the signal strength received at a given location is sufficient to support communication.

II. Description of the Related Art

In conventional cellular telephone systems the available frequency band is divided into channels typically 30 KHz in bandwidth while analog FM modulation techniques are used. The system service area is divided geographically into cells of varying size. The available frequency channels are divided into sets with each set usually containing an equal number of channels. The frequency sets are assigned to cells in such a way as to minimize the possibility of co-channel interference. For example, consider a system in which there are seven frequency sets and the cells are equal size hexagons. A frequency set used in one cell will not be used in the six nearest or surrounding neighbors of that cell. Furthermore, the frequency set in one cell will not be used in the twelve next nearest neighbors of that cell.

In the conventional cellular telephone system, the handoff scheme implemented is intended to allow a call to continue when a mobile telephone crosses the boundary between two cells. The handoff from one cell to another is initiated when the receiver in the cell base station handling the call notices that the received signal strength from the mobile telephone falls below a predetermined threshold value. A low signal strength indication implies that the mobile telephone must be near the cell border. When the signal level fails below the predetermined threshold value, the base station asks the system controller to determine whether a neighboring base station receives the mobile telephone signal with better signal strength than the current base station.

In a code division multiple access (CDMA) cellular telephone system, a common frequency band is used for communication with all base stations in a system. The common frequency band allows simultaneously communication between a mobile station and more than one base station. Signals occupying the common frequency band are discriminated at the receiving station through the spread spectrum CDMA waveform properties based on the use of a high speed pseudonoise (PN) code. The high speed PN code is used to modulate signals transmitted from the base stations and the mobile stations. Transmitter stations using different PN codes or PN codes that are offset in time produce signals that can be separately received at the receiving station. The high speed PN modulation also allows the receiving station to receive a signal from a single transmitting station where the signal has traveled over several distinct propagation paths.

The common frequency band utilized throughout a CDMA cellular communication system allows the mobile station to remain in communication with more than one cellular base station during the handoff. In this environment communication between the mobile station and the other user is uninterrupted by the eventual handoff from the base station corresponding to the cell from which the mobile station is exiting, to the base station corresponding to cell into which the mobile station is entering. This type of handoff may be considered as a "soft" handoff in communications between cell base stations with the mobile wherein two or more base stations, or sectors of base stations, transmit concurrently to the mobile station. Similar are the techniques for a handoff between a sector of one cell and another cell, and a handoff between sectors of a same cell base station for a sectorized cell.

The cellular system controller typically begins the base station diversity or so-called "soft handoff" process. The cellular system controller begins by assigning a modem located in the new base station to the call. This modem is given the PN address associated with the call between the mobile station and the current base station modem. The new base station modem assigned to service the call searches for and finds the mobile station transmitted signal. The new base station modem also begins transmitting a forward link signal to the mobile station. The mobile station's searcher element searches for this forward link signal according to the signal information provided by the old base station. When the mobile station acquires the new base station modem transmitted signal, the mobile station may continue to communicate through the two base stations. Another base station could be added in the same manner as the first new base station above. In this case the mobile station may continue to communicate through three base stations. This process can continue until the mobile station is in communication with one base station for each demodulation element that the mobile station contains and beyond.

Since the mobile station is communicating with the user via at least one base station at all times throughout a soft handoff there is no interruption in communications between the mobile station and the user. A soft handoff in communications therefore provides significant benefits in its inherent "make before break" communication over conventional "break before make" techniques employed in other cellular communication systems.

In an exemplary CDMA cellular telephone system, such as is described in U.S. Pat. No. 5,267,261, entitled MOBILE STATION ASSISTED SOFT HANDOFF IN A CDMA CELLULAR COMMUNICATIONS SYSTEM, which is assigned to the assignee of the present invention and which is herein incorporated by reference, there is described a particular technique for effecting a soft handoff of the type described above. This technique is applicable to systems in which each base station transmits a spread spectrum "pilot" reference signal. These pilot signals are issued by the mobile stations to obtain initial system synchronization and to provide robust time, frequency, and phase tracking of the base station transmitted signals. The pilot signal transmitted by each base station in a system may use the same PN code but with a different code phase offset, meaning that the PN codes transmitted by neighboring base stations are identical but skewed in time with respect to one another. Phase offset allows the pilot signals to be distinguished from one another according to the base station from which they originate.

The system of the U.S. Pat. No. 5,267,261 contemplates maintaining within the mobile station several lists of base stations from which the received signal strength exceeds predetermined levels. The process of searching for base station pilot signals may be streamlined by defining four distinct sets of pilot offsets: the Active Set, the Candidate Set, the Neighbor Set and the Remaining Set. The Active Set identifies the base station(s) or sector(s) through which the mobile station is communicating. The Candidate Set identifies the base station(s) or sector(s) for which the pilots have been received at the mobile station with sufficient signal strength to make them members of the Active Set, but have not been placed in the Active Set by the base station(s). The Neighbor Set identifies the base station(s) or sector(s) which are likely candidates for the establishment of communication with the mobile station. The Remaining Set identifies the base station(s) or sector(s) having all other possible pilot offsets in the current system, excluding those pilot offsets currently in the Active, the Candidate and Neighbor sets.

After a call is initiated the mobile station continues to scan the pilot signals transmitted by base stations located in neighboring cells. Pilot signal scanning continues in order to determine if one or more of the neighboring base station transmitted pilot signals rises above a predetermined threshold, a level which is indicative that communications may be supported between the base station and the mobile station. When the pilot signal transmitted by a base station located in a neighboring cell rises above the threshold, it serves as an indication to the mobile station that a handoff should be initiated. In response to this pilot signal strength determination, the mobile station generates and transmits a control message to the base station presently servicing the call. This control message is relayed on to the system controller, which determines whether a handoff procedure should be initiated based on the availability of system resources.

In the above-mentioned CDMA system of U.S. Pat. No. 5,267,261 the process of placing a Neighbor Set base station member in the Candidate Set proceeds as follows. The pilot signal from the base station is first compared with a predefined threshold value. Upon the mobile station making a determination that the measured value exceeds a predefined threshold, the mobile station control processor generates and transmits a corresponding Pilot Strength Measurement Report Message. This Report Message is received by the base station with which the mobile station is currently in communication, and is forwarded to the system controller.

The decision for placing a Candidate Set member into the Active Set is made by the system controller. For example, when the measured Candidate pilot is of a signal strength which exceeds the signal strength of one other Active Set member pilot by a predetermined value it may join the Active Set. In an exemplary system there are limits placed on the number of Active Set members. Should the addition of a pilot to the Active Set exceed the Active Set limit, the weakest Active Set pilot may be removed to another set.

Unfortunately, however, conventional pilot strength measurement techniques tend to erroneously identify pilot signals of insufficient energy as exceeding the predefined Candidate Set signal strength threshold. Such erroneous pilot strength measurements may result in "false alarms", in which a member of the Neighbor Set is improperly added to the Candidate Set. This improper addition may in turn lead to the occurrence of a "false" handoff, i.e., a call transfer to a base station incapable of establishing communication with the mobile unit.

Accordingly, it is an object of the present invention to provide an improved method of searching for and identifying only those pilot signals transmitted by viable base station handoff candidates.

SUMMARY OF THE INVENTION

The present invention provides a novel and improved method and system for performing a pilot signal searching operation in anticipation of handoff in mobile station communication between base stations. The present invention is described herein in an exemplary embodiment as a cellular communication system which uses code division multiple access (CDMA) modulation techniques. In the system, each base station transmits a pilot signal of a common PN spreading code offset in code phase from pilot signals of other base stations. In system communications with the mobile station, the mobile station is provided with a list of PN offsets corresponding to base stations of neighboring cells. In addition, the mobile is provided with a message which identifies at least one pilot corresponding to a base station to which the mobile station is to communicate through. These lists are stored at the mobile station as a Neighbor Set and an Active Set of pilots. In addition to the Neighbor and Active Sets of pilots, the mobile station maintains a list of Candidate and Pre-Candidate Sets of pilots. Based on analysis of the pilot signals received at the mobile station, base station entries from the Neighbor Set may be assigned to the Pre-Candidate and Candidate Sets, and eventually to the Active set.

In an exemplary implementation each entry in the Neighbor Set corresponds to a base station in a predetermined proximity of the mobile station. At the mobile station, signal strength is measured for the pilot signals transmitted by each of the base stations within the neighbor list. The signal strength measurements corresponding to each base station entry within the Neighbor Set are compared to a first predetermined level. One or more entries from the Neighbor Set having a base station signal strength measurement greater than the first predetermined level may be placed in the Pre-Candidate Set.

The strength of the pilot signals associated with entries in the Pre-Candidate Set are then further evaluated to determine eligibility within the Candidate Set, from which are selected the entries comprising the Active Set. Upon a base station being added to the Active Set, the system controller communicates information instructing the added base station to establish communications with the mobile station. The mobile station communications are thus routed through all base stations identified by pilots in the mobile station Active Set.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1A:
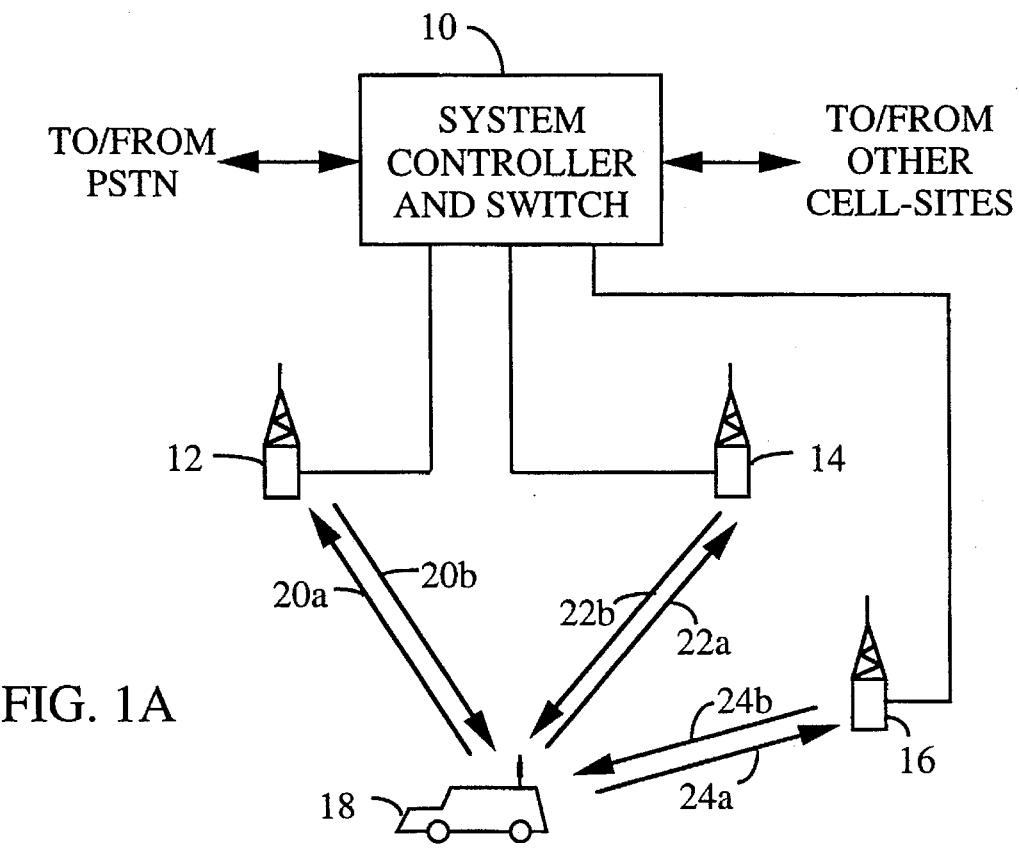
FIG. 1A provides an exemplary illustration of a cellular telephone system in which may be applied the pilot signal searching technique of the present invention.

In a CDMA cellular communication system, the same frequency band can be used for all cells. The CDMA waveform properties that provide processing gain are also used to discriminate between signals that occupy the same frequency band. A mobile station, or for short mobile, such as a vehicle mounted telephone or portable telephone, or personal communications system (PCS) handset, thus need not switch frequencies when handoff of the call is made from one base station to another. Furthermore, the probability that the call will be discontinued if the handoff command is received in error is substantially reduced.

In a CDMA cellular communications system, each base station has a plurality of modulator-demodulator stations or spread spectrum modems. Each modem consists of a digital spread spectrum transmit modulator, at least one digital spread spectrum data receiver and a searcher receiver. Each modem at the base station is assigned to a mobile as needed to facilitate communications with the assigned mobile. Therefore in many instances many modems are available for use while other ones may be Active in communicating with respective mobiles.

In a "soft" handoff scheme employed within a CDMA cellular communications system, such as a CDMA cellular telephone, Private Branch Exchange, or PCS system, a new base station modem is assigned to a mobile while the old base station continues to service the call. When the mobile is located in the transition region between the two base stations, the call can be provided through the various base stations as signal strength dictates. Since the mobile is always communicating through at least one base station, no disrupting effects to the mobile station or in service will occur. It should be understood that many aspects of the handoff techniques disclosed herein are also applicable to handoffs between sectors in a sectorized cell.

When mobile station communications are firmly established with the new base station, e.g. the mobile is well within the new cell, the old base station discontinues servicing the call. The resultant soft handoff is in essence a make-before-break switching function. In contrast, conventional cellular telephone systems can be considered as providing a break-before-make switching function.

In the present invention, a pilot signal searching technique is implemented which reduces the incidence of "false alarms" occurring upon erroneous measurement at the mobile station of base station pilot signal strength. In particular, when pilot signals are mistakenly identified as exceeding a predefined handoff threshold, a "false handoff" may occur upon call transfer to the base stations from which the received pilot strength was measured to be in excess of a predefined handoff threshold, but which is actually less than the threshold. Again, a false handoff corresponds to the situation in which a call is transferred to a base station incapable of establishing communication with the mobile station.

Although it is preferred that the mobile initiate the handoff request and determine the new base station, handoff process decisions may be made as in the conventional cellular telephone system. As discussed previously with respect to conventional systems, the base station determines when a handoff may be appropriate and, via the system controller, requests neighboring cells to search for the mobile's signal. The base station receiving the strongest signal as determined by the system controller then accepts the handoff.

The above-referenced pilot signal may be defined as the transmission from a given base station of a "pilot carrier" upon a corresponding pilot channel. The pilot signal is an unmodulated, direct sequence, spread spectrum signal transmitted at all times by each base station using a common pseudorandom noise (PN) spreading code. The pilot signal allows the mobile stations to obtain initial system synchronization, i.e. timing, in addition to providing a phase reference for coherent demodulation and a reference for signal strength for comparisons between base stations for handoff determination.

The pilot signal as transmitted by each base station is of the same PN spreading code but with a different code phase offset. For example, in the present invention the pilot signal spreading code is of a PN code length of $2^{15}$. In this example there are 511 different offsets from the zero offset, where the offsets are in increments of 64 PN chips. It is this phase offset which allows the pilot signals to be distinguished from one another by the mobile station, resulting in a differentiation between base stations from which they originate. Use of the same pilot signal code allows the mobile station to find system timing synchronization by a single search through all pilot signal code phases. The strongest pilot signal, as determined by an integration process for each code phase, is readily identifiable. The identified pilot signal generally corresponds to the pilot signal transmitted by the nearest base station.

An exemplary illustration of a cellular telephone system, alternately representative of a PBX or PCS system, in which the pilot signal searching technique of the present invention may be applied is provided in FIG. 1A. The system illustrated in FIG. 1A utilizes CDMA modulation techniques in communication between the system mobile stations or mobile telephones, and the base stations. Cellular systems in large cities may have hundreds of base stations serving hundreds of thousands of mobile telephones. The use of CDMA-techniques readily facilitates increases in user capacity in systems of this size as compared to conventional FM modulation cellular systems.

In FIG. 1A, system controller and switch 10, also referred to as mobile telephone switching office (MTSO), typically includes interface and processing circuitry for providing system control to the base stations. Controller 10 also controls the routing of telephone calls from the public switched telephone network (PSTN) to the appropriate base station for transmission to the appropriate mobile station. Controller 10 also controls the routing of calls from the mobile stations, via at least one base station to the PSTN. Controller 10 may direct calls between mobile users via the appropriate base station(s) since such mobile stations do not typically communicate directly with one another.

Controller 10 may be coupled to the base stations by various means such as dedicated telephone lines, optical fiber links or by microwave communication links. In FIG. 1A, three such exemplary base stations, 12, 14 and 16 along with an exemplary mobile station 18, which includes a cellular telephone, are illustrated. Arrows 20a–20b define the possible communication link between base station 12 and mobile station 18. Arrows 22a–22b define the possible communication link between base station 14 and mobile station 18. Similarly, arrows 24a–24b define the possible communication link between base station 16 and mobile station 18.

The base station service areas or cells are designed in geographic shapes such that the mobile station will normally be closest to one base station. When the mobile station is idle, i.e. no calls in progress, the mobile station constantly monitors the pilot signal transmissions from each nearby base station. As illustrated in FIG. 1A the pilot signals are respectively transmitted to mobile station 18 by base stations 12, 14 and 16 respectively upon communication links 20b, 22b and 24b. The mobile station then determines which cell it is in by comparing pilot signal strength transmitted from these particular base stations.

In the example illustrated in FIG. 1A, mobile station 18 may be considered closest to base station 16. When mobile station 18 initiates a call, a control message is transmitted to the nearest base station, base station 16. Base station 16 upon receiving the call request message, signals system controller 10 and transfers the call number. System controller 10 then connects the call through the PSTN to the intended recipient.

Should a call be initiated within the PSTN, controller 10 transmits the call information to all the base stations in the area. The base stations in return transmit a paging message to the intended recipient mobile station. When the mobile station hears a page message, it responds with a control message that is transmitted to the nearest base station. This control message signals the system controller that this particular base station is in communication with the mobile station. Controller 10 then routes the call through this base station to the mobile station.

Should mobile station 18 move out of the coverage area of the initial base station, base station 16, an attempt is made to continue the call by routing the call through another base station. In the handoff process there are two different methods of initiating the handoff of the call or routing through another base station.

The first method, called the base station initiated handoff, is similar to the handoff method employed in the original first generation analog cellular telephone systems currently in use. In the base station initiated handoff method, the initial base station, base station 16, notices that the signal transmitted by mobile station 18 has fallen below a certain threshold level. Base station 16 then transmits a handoff request to system controller 10. Controller 10 relays the request to all neighboring base stations, 14, 12 of base station 16. The controller transmitted request includes information relating to the channel, including the PN code sequence used by mobile station 18. Base stations 12 and 14 tune a receiver to the channel being used by the mobile station and measure the signal strength, typically using digital techniques. If one of base stations 12 and 14 receivers report a stronger signal than the initial base station reported signal strength, then a handoff is made to this base station.

The second method of initiating a handoff is called the mobile initiated handoff. The mobile station is equipped with a search receiver which is used to scan the pilot signal transmission of neighboring base stations 12 and 14, in addition to performing other functions. If a pilot signal of base stations 12 and 14 is found to be stronger, such as by a predetermined threshold, than the pilot signal of base station 16, mobile station 18 transmits a message to the current base station, base station 16. An interactive process between the mobile station and the base station then permits the mobile station to communicate through the one or more of base stations 12, 14 and 16.

The mobile initiated handoff method has various advantages over the base station initiated handoff method. The mobile station becomes aware of changes in paths between itself and the various neighboring base stations much sooner than the base stations are capable of doing. However, to perform a mobile initiated handoff, each mobile station must be provided with a searching receiver to perform the scan function. However, in the exemplary embodiment described herein of a mobile station CDMA communications capability, the search receiver has additional functions which require its presence.

The mobile initiated handoff relies on the mobile station to detect the presence or absence of pilot signals, and the signal strength of the pilot signals. The mobile station identifies and measures the signal strength of the pilot signals which it receives. This information is communicated via the base station(s) to which the mobile station is communicating through to the MTSO. The MTSO upon receiving this information initiates or tears down the soft handoffs. To streamline the process of searching for pilots, four distinct sets of pilot offsets are defined: the Active Set, the Candidate Set, the Neighbor Set, and the Remaining Set. The Active Set identifies the base station(s) or sector(s) through which the mobile station is communicating. The Candidate Set identifies the base station(s) or sector(s) for which the pilots have been received at the mobile station with sufficient signal strength to make them members of the Active Set, but have not been placed in the Active Set by the base station(s). The Neighbor Set identifies the base station(s) or sector(s) which are likely candidates for the establishment of communication with the mobile station. The Remaining Set identifies the base station(s) or sector(s) having all other possible pilot offsets in the current system, excluding those pilot offsets currently in the Active, the Candidate and Neighbor sets.

While the mobile station is in a traffic channel mode of communication with the base station, under the control of the mobile station control processor the searcher receiver systematically surveys the strengths of all pilots in the four pilot sets, on the current CDMA frequency assignment. The results of the survey are provided to the mobile station control processor for further use.

The survey results are sent to the base station(s) with which the mobile station is communication. In a preferred implementation the survey report contains a list of pilots and their measured strengths. The first pilot in the list is the pilot used to derive the time reference of the mobile station. The earliest arriving multipath component that is demodulated is typically used as the time reference for the mobile station. The mobile station measures the phase of the reported pilot relative to the zero offset pilot PN sequence using timing derived from the pilot used as the time reference. With each reported pilot the mobile station returns the value PILOT_PN_PHASE within the survey report, where this value is defined according to Equation (1):

$$\text{PILOT\_PN\_PHASE}_j = [64 \times \text{PILOT\_PN}_j + t_i - t_j] \cdot \text{modulo } 2^{15} \quad (1)$$

where:

PILOT_PN_PHASE$_j$ is the phase of the pilot of base station j; and $t_i$ and $t_j$ respectively denote the one-way delays in PN chips from the respective base stations to the mobile station.

Figure 1B:
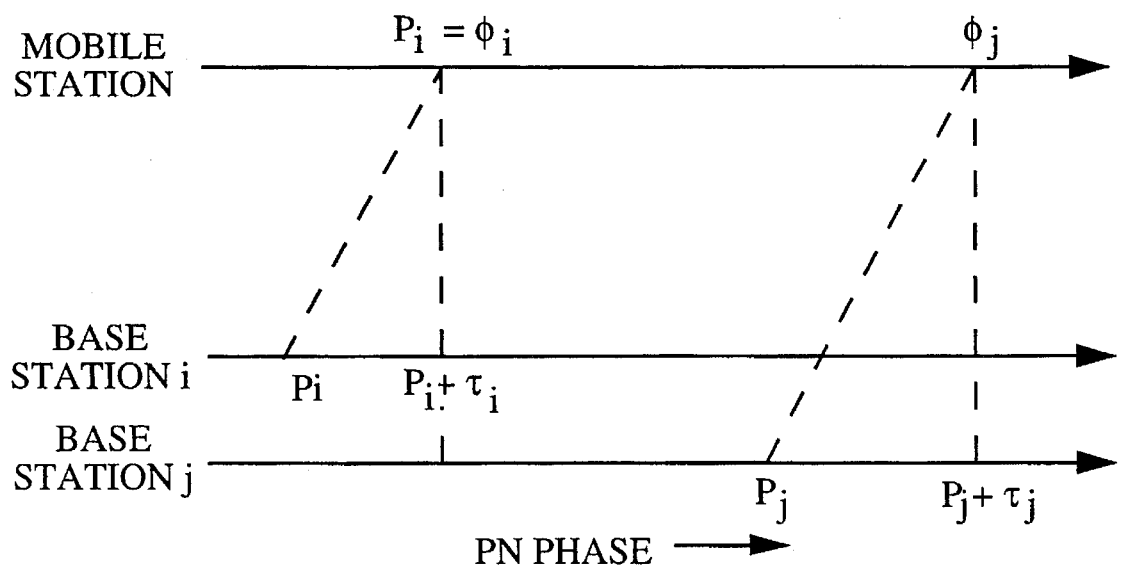
FIG. 1B illustratively represents the concept of time reference and calculation of PN phase offsets for pilots from a number of base stations.

The concept of time reference and calculation of PN phase offsets for pilots from other base stations is illustrated in FIG. 1B. It should be noted that timing in the mobile station is offset from timing in the base stations by $t_i$ chips. The required pilot PN phase, $f_j$, is obtained from FIG. 1B by observing that:

$$f_j - f_i = P_j + t_j - [P_i + t_i] \quad (2)$$

with the time reference, $P_i = f_i$; and where:

$$P_i = 64 \times \text{PILOT\_PN}_i \text{ and} \quad (3)$$

$$P_j = 64 \times \text{PILOT\_PN}_j \quad (4)$$

As noted above, the searcher receiver systematically surveys the strengths of all pilots in the four pilot sets. The search rate for members of the Active Set and the Candidate Set are preferably identical. The search range (i.e., search window) for all members of the Active Set and the Candidate Set is specified in terms of a predetermined number of PN chips. For each member of the Active Set and the Candidate Set, the search window is centered around the earliest arriving usable multipath component. A multipath component is termed usable if it is of sufficient strength so that the mobile station would use it to demodulate data.

Figure 2:
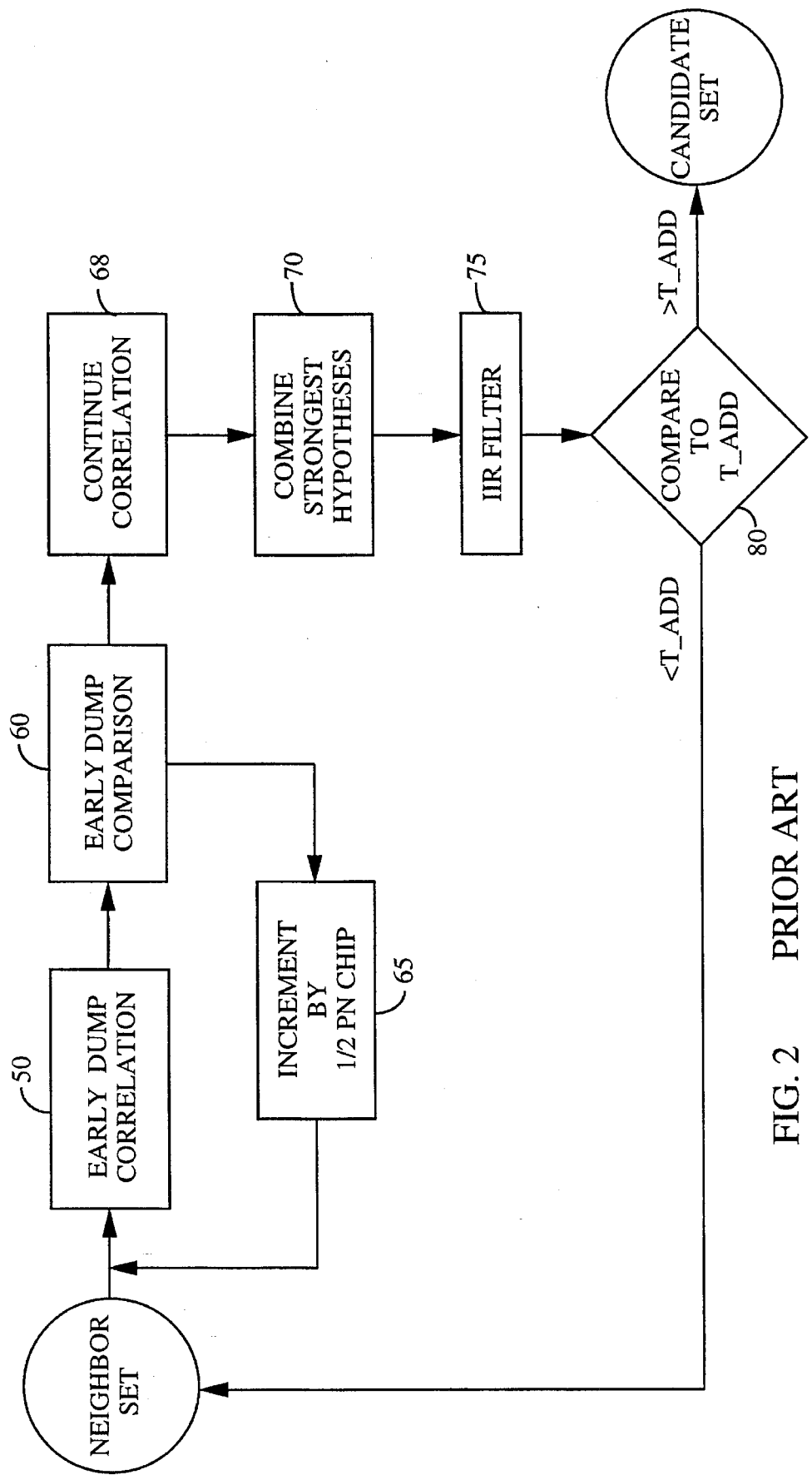
FIG. 2 shows a generalized flow chart representation of a conventional pilot signal searching technique utilized to identify and place base stations within a mobile station listing of Candidate Set base stations.

Turning now to FIG. 2, there is shown a generalized flow chart representation of a conventional pilot signal searching technique utilized to identify and place base stations within the Candidate Set. As a specific example, consider the case of one member base station in the Active Set, one in the Candidate Set, and ten in the Neighbor Set. A preferred order in which the pilot signals from the base stations within the Active (A), Candidate (C) and Neighbor (Ni) Sets are searched is given as follows:

A, C, $N_1$; A, C, $N_2$; ..., A, C, $N_{10}$; A, C, $N_1$; ...

For each search window of predetermined PN chip width centered around a pilot in the Neighbor Set, the received PN pilot signal is decorrelated using a set of locally-generated "hypotheses" of the PN pilot signal. In an exemplary CDMA system an identical pilot PN signals is transmitted from each base station. However, discrimination between pilot signals from different base stations is made possible by transmitting each with a different timing offset. Each pilot signal hypothesis may be generated by:

(i) slewing a local PN pilot generator to the timing offset of the base station pilot being searched so as to produce a locally-generated replica thereof; and (ii) slewing the locally-generated pilot signal replica to a unique timing offset within the search window. Hence, each pilot signal hypothesis corresponds to a "guess" as to the time of arrival within the search window of the pilot signal from a selected base station.

In searching for the pilot from a member of the Neighbor Set, a search window is defined about the expected time of arrival at the mobile station of the Neighbor pilot being searched. An initial Neighbor pilot hypothesis, corresponding to arrival of the Neighbor pilot at the beginning of the search window, is then generated at the mobile station. The initial hypothesis is correlated with the received pilot signal over a first selected number (e.g., 100) of PN chips, and the results of the correlation integrated over the same chip interval (step 50). The result is then compared (step 60) to a predefined early dump threshold. If the result is less than the early dump threshold, the value of received signal energy associated with the hypothesis is set to zero, or, for convenience of expression, "the hypotheses is set to zero". If the initial hypothesis is set to zero, the search moves on to the next hypothesis. The next hypothesis is obtained by slewing the timing of the local PN pilot generator (step 65) by ½ PN chip.

If integration of the decorrelated initial hypothesis produces a non-zero value exceeding the early dump threshold, decorrelation/integration of the initial hypothesis with the received pilot is continued (step 68) for a second selected number (e.g., 412) of PN chips. The aggregate result of the first and second integrations, performed over the exemplary number of 512 PN chips of the initial hypothesis, is then stored by the mobile station controller. This process of decorrelation and integration is then repeated for each of the hypotheses within the search window.

After each hypothesis has been tested through the decorrelation/integration process described above, the integration values associated with the three strongest hypotheses are combined (step 70) in a digital adder and filtered (step 75) by an infinite impulse response (IIR) filter. These three largest values correspond to the energy of the three strongest multipath components of the pilot signal within the Neighbor Set currently under evaluation. In an exemplary implementation, the IIR filter is realized in accordance with the following second-order transfer function:

$$Y(n) = 0.5 \times Y(n-1) + 0.5 \times C_3 \quad (5)$$

where:

Y(n) denotes the output of the IIR filter; and the parameter $C_3$ represents the combined energy of the three strongest pilot paths produced by the digital adder.

The filtered output Y(n) from the IIR filter is then compared (step 80) to a Candidate Set threshold (T_ADD). If Y(n) exceeds T_ADD, the base station from which the pilot signal was received is added to the Candidate Set. If Y(n) is less than T_ADD, the base station remains in the Neighbor Set.

Although the IIR filter output Y(n) has been described to correspond to received pilot energy, it is understood that the comparison with T_ADD could actually be made in terms of received pilot energy per chip to total received spectral density (i.e., noise and signal). In this instance the parameter T_ADD would correspond to a predetermined minimum Candidate level of signal to noise (S/N), to which the received pilot S/N level would be compared.

Unfortunately, the conventional pilot measurement process depicted in FIG. 2 has resulted in received pilot signals being erroneously identified as being of a strength in excess of T_ADD. The resulting relatively high incidence of "false alarms" may be at least in part attributed to the relatively short PN decorrelation and integration time (e.g., 512 PN chips) upon which is based the received pilot strength comparison with the Candidate strength threshold T_ADD. It is conceivable that merely lengthening the decorrelation/integration interval could reduce the false alarm rate, but this adjustment would also increase the detection period required to evaluate the strength of each Neighbor pilot signal. Under rapidly changing channel conditions, such as are often experienced within cellular communications systems, such increased pilot strength detection periods could impair system performance by slowing the process by which eligible base stations are added to the Candidate Set. As is described hereinafter, the present invention provides an improved pilot searching technique affording a lower incidence of "false alarms" for a given pilot strength detection period.

Figure 3:
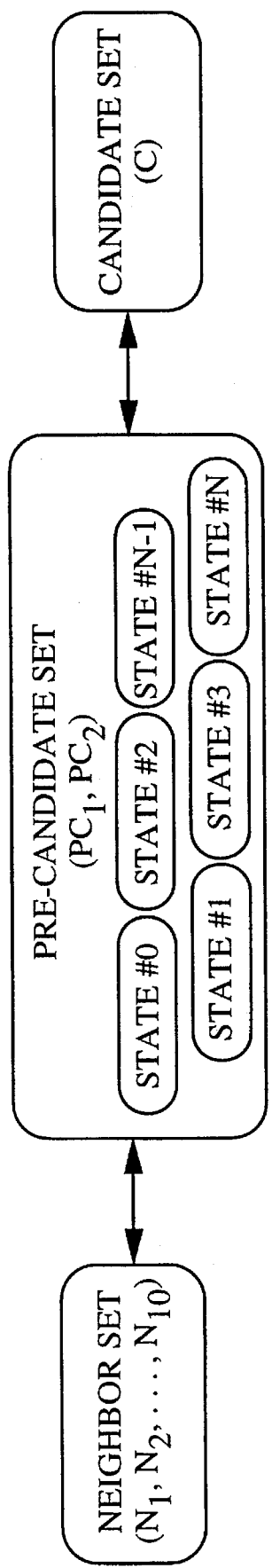
FIG. 3 shows a generalized representation of an improved pilot signal searching technique in accordance with the present invention.

Turning now to FIG. 3, there is shown a generalized representation of an improved pilot signal searching technique in accordance with the present invention. The inventive pilot signal searching technique contemplates the creation of a transitional base station category, termed the "Pre-Candidate Set", to which base stations are assigned from the Neighbor Set. In a preferred embodiment the Pre-Candidate Set includes a set of "N" Pre-Candidate States (i.e., State #0, State #1, . . . , State #N), which may be viewed as comprising a Markov chain of Pre-Candidate States. As is described below, qualifying base stations from the Neighbor Set are initially assigned to a predefined Pre-Candidate State (e.g., State #1), and are transferred to other Pre-Candidate States based on the results of decorrelation/integration operations performed using the received pilot signal associated therewith. Upon progressing through a sequence of States within the Pre-Candidate Set, each base station entering the Pre-Candidate Set is eventually either returned to the Neighbor Set (e.g., from Pre-Candidate State #0), or assigned to the Candidate Set (e.g., from Pre-Candidate State #N).

As is indicated by FIG. 3, in an exemplary case one member base station is included in the Active Set, one in the Candidate Set, two in the Pre-Candidate Set, and ten in the Neighbor Set. A preferred order in which the pilot signals from the base stations within the Active (A), Candidate (C), Pre-Candidate ($PC_i$) and Neighbor ($N_i$) Sets are searched is as follows:

$A,C,PC_1,PC_2,N_1; A,C,PC_1,PC_2,N_2; \ldots , A,C,PC_1,PC_2,N_{10}; A,C, PC_1,PC_2,N_1; \ldots$ For each search window of predetermined PN chip width centered around a pilot in the Neighbor Set, the received PN pilot signal is decorrelated using a set of locally-generated hypotheses of the PN pilot signal. Again, in an exemplary CDMA system identical pilot PN signals are transmitted from each base station. However, discrimination between pilot signals from different base stations is made possible by transmitting each with a different timing offset. As mentioned above, each pilot signal hypothesis may be generated by:

(i) slewing a local PN pilot generator to the timing offset of the base station pilot being searched so as to produce a locally-generated replica thereof; and (ii) slewing the locally-generated pilot signal replica to a unique timing offset within the search window.

Figure 4:
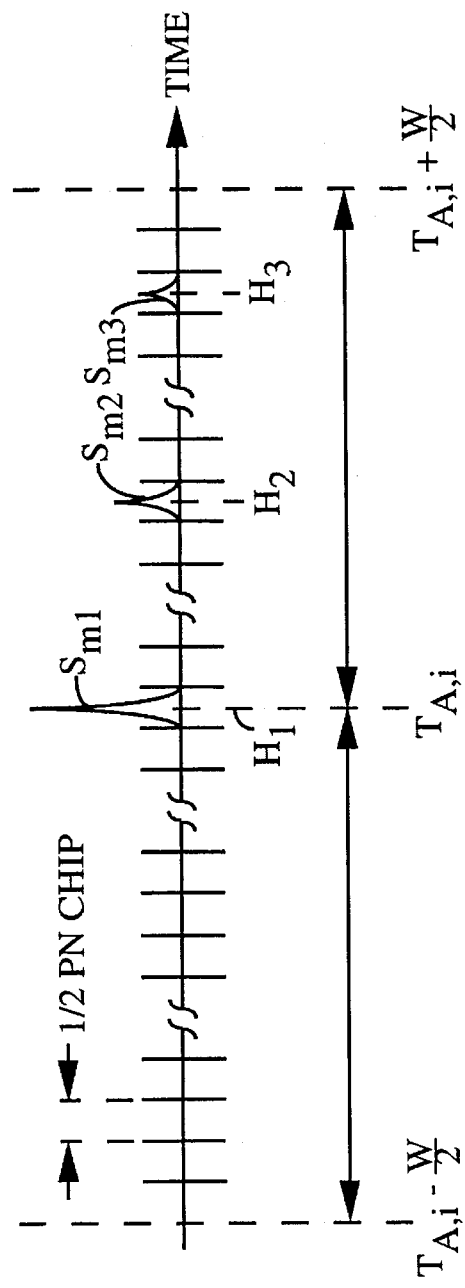
FIG. 4 illustratively represents a search window of a width W centered about an expected time of arrival at the mobile station of a pilot signal from a Neighbor Set base station.

FIG. 4 illustratively represents a search window of a width W centered about the expected time of arrival ($T_{A,i}$) at the mobile station of the pilot signal from the base station $N_i$ within the Neighbor Set. The search window is seen to be divided into equivalent time intervals of ½ PN chip, each of which corresponds to one of the aforementioned "hypotheses" as to the time of arrival of the particular pilot signal for which a search is being conducted. In the illustration of FIG. 4, the strengths of three multipath components ($S_{m1}$, $S_{m2}$ and $S_{m3}$) of the pilot signal transmitted by base station $N_i$ are staggered along the horizontal axis based on time of arrival at the mobile station within the search window ($T_{A,i}-W/2 < t < T_{A,i}+W/2$). The strengths of the multipath signal components $S_{i,m1}$, $S_{i,m2}$ and $S_{i,m3}$ are obtained by decorrelating/integrating the received pilot energy in the aforementioned manner using the pilot hypotheses $H_1$, $H_2$ and $H_3$.

Figure 5A:
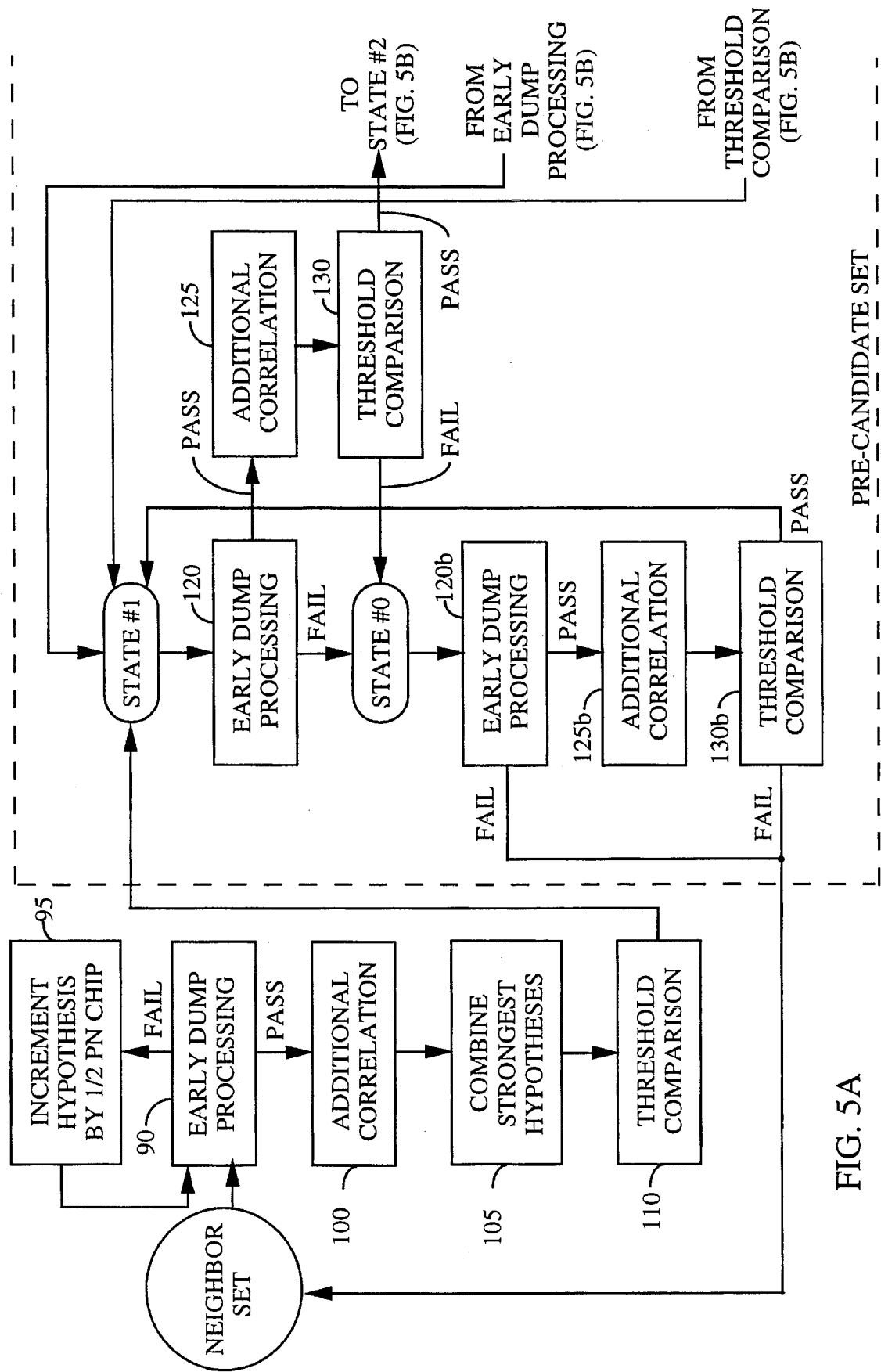
FIGS. 5A and 5B is a flow chart useful for describing operation of the novel pilot signal searching technique of the invention.
Figure 5B:
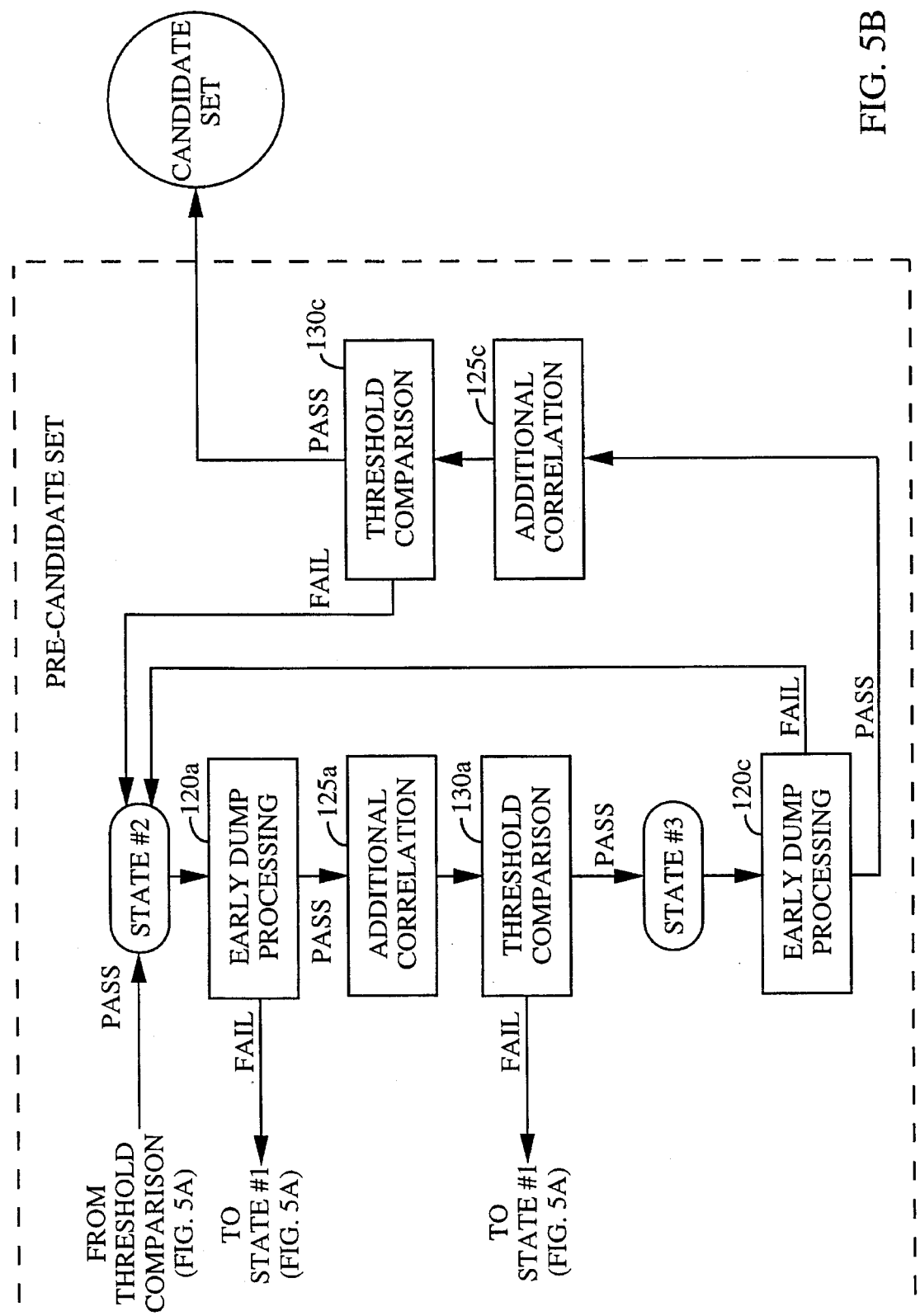

Referring now to FIGS. 5A and 5B, there is provided a flow chart useful for describing operation of the novel pilot signal searching technique of the invention. In searching for the pilot from a member of the Neighbor Set, a search window is defined about the expected time of arrival at the mobile station of the Neighbor pilot being searched. An initial Neighbor pilot hypothesis, corresponding to arrival of the Neighbor pilot at the beginning of the search window, is then generated at the mobile station. The initial hypothesis is decorrelated with the received pilot signal over a first selected number (e.g., 100) of PN chips, and the results of the decorrelation integrated over the same chip interval. The integration result is then compared (step 90) to a predefined early dump threshold. If the result is less than the early dump threshold, the hypothesis is set to zero and the search moves on to the next hypothesis, which is offset in time by ½ PN chip from the initial hypothesis (step 95).

Again referring to the flow chart of FIGS. 5A and 5B, if the results of the early dump integration lead to the initial hypothesis being set to a value exceeding the early dump threshold, a second decorrelation/integration of the initial hypothesis with the received pilot is performed (step 100) for a selected number (e.g., 412) of PN chips. Each of the hypotheses remaining within the search window, mutually spaced apart by ½ PN chip, are then decorrelated/integrated in the same manner as the initial hypothesis. That is, in the preferred embodiment each hypothesis is decorrelated for 100 PN chips, integrated over the same PN chip period, and the integration result compared to an early dump threshold. For those hypotheses for which the value of the "early dump" integration exceeds the early dump threshold, the decorrelation/integration procedure is continued for another 412 PN chips.

Among those hypotheses within a given search window for which a second decorrelation/integration is performed (i.e., for each hypothesis decorrelated and integrated for 512 PN chips), the three highest-valued integration results are combined (step 105). The combined result is then compared (step 110) to a first Pre-Candidate threshold, and if the first Pre-Candidate threshold is exceeded the associated base station is transferred from the Neighbor Set to a first Pre-Candidate State (State #1). Otherwise, the base station remains in the Neighbor Set.

As noted above, in the instant example there are assumed to exist two base stations (i.e., $PC_1$ and $PC_2$) within the Pre-Candidate Set. The Pre-Candidate processing of the pilot signal associated with the base station $PC_1$ is described immediately below, it being understood that upon base station $PC_1$ being placed in the Candidate Set, or returned to the Neighbor Set, the pilot signal for base station $PC_2$ is processed in a substantially identical manner.

After base station $PC_1$ is placed within State #1, a Pre-Candidate search window is defined about the earliest arriving usable multipath component. Again, a multipath component is termed usable if it is of sufficient strength that the mobile station would use it to demodulate data. A first pilot hypothesis, corresponding to arrival at the beginning of the Pre-Candidate search window of the pilot signal from base station $PC_1$, is then generated at the mobile station. In a preferred implementation this first hypothesis is correlated with the received $PC_1$ pilot signal over 100 PN chips, and the results of the correlation integrated over the same chip interval. The integration result is then compared (step 120) to a predefined early dump threshold. If the result is less than the early dump threshold, the hypothesis is set to zero and the search moves on to the next pilot $PC_1$ hypothesis, which is offset in time by ½ PN chip from the first hypothesis. Otherwise, decorrelation/integration of the first hypothesis is continued for a preselected number (e.g., 700) of PN chips.

Each of the ½ PN chip spaced-apart hypotheses remaining within the Pre-Candidate search window for base station $PC_1$, are then decorrelated/integrated in the same manner as the initial hypothesis. Among those hypotheses within the PC$_1$ search window for which a second decorrelation/integration is performed (i.e., for each hypothesis decorrelated and integrated for another 700 PN chips), the three highest-valued integration results are combined (step 125). The combined result is then compared to a State #2 Pre-Candidate threshold, and if this threshold is exceeded base station PC$_1$ is transferred from State #1 to State #2 of the Pre-Candidate Set. Otherwise, the base station PC$_1$ is placed in State #0 of the Pre-Candidate Set (step 130).

In the preferred embodiment, processing proceeds exactly as described above with reference to Pre-Candidate State #1 upon base station PC$_1$ being transferred to either State #2 or State #0. For example, if base station PC$_1$ is placed in State #2, an early dump decorrelation/integration and comparison to an early dump threshold (step 120a) is performed. Next, further decorrelation/integration and multipath combination (step 125a) is accomplished in the same manner as was done in step 125. The resultant combined integration result is compared with a State #3 Pre-Candidate threshold, and if this threshold is exceeded base station PC$_1$ is transferred from State #2 to State #3 of the Pre-Candidate Set. Otherwise, the base station PC$_1$ is returned to State #1 of the Pre-Candidate Set (step 130a).

Similarly, if base station PC$_1$ had been transferred from State #1 to State #0, a set of steps 120b, 125b and 130b analogous to steps 120, 125 and 130 would then be performed. Based on the results of execution of steps 120b, 125b and 130b, base station PC$_1$ would then either again be placed in State #1, or would be returned to the Neighbor Set. Base station PC$_1$ remains in the Pre-Candidate Set until being so returned to the Neighbor Set from State #0, or upon being transferred to the Candidate Set from State #3 subsequent to execution of steps 120c, 125c and 130c. Upon base station PC$_1$ leaving the Pre-Candidate Set, the pilot signal from base station PC$_2$ is evaluated in a substantially identical manner.

In accordance with the invention, the various comparison thresholds and PN chip integration intervals may be set differently within the steps 120a,b,c through 130a,b,c as a means of varying the conditions under which transitions occur between States within the Pre-Candidate Set. In general, increasing the level of each Pre-Candidate State threshold will increase the "detection probability" that base stations transferred from the Pre-Candidate Set to the Candidate Set will be capable of establishing communication with the mobile unit. Similarly, increasing the length of the decorrelation/integration intervals between Pre-Candidate States will also tend to increase detection probability, and thereby reduce the probability of "false handoffs" (i.e., call handoffs to base stations improperly placed within the Candidate Set). It is anticipated that reducing such threshold levels and integration intervals will tend to reduce base station detection probability, but will favorably reduce the mean Candidate Set acquisition time (i.e., the average transition time from the Neighbor Set to the Candidate Set via the Pre-Candidate Set).

Figure 6:
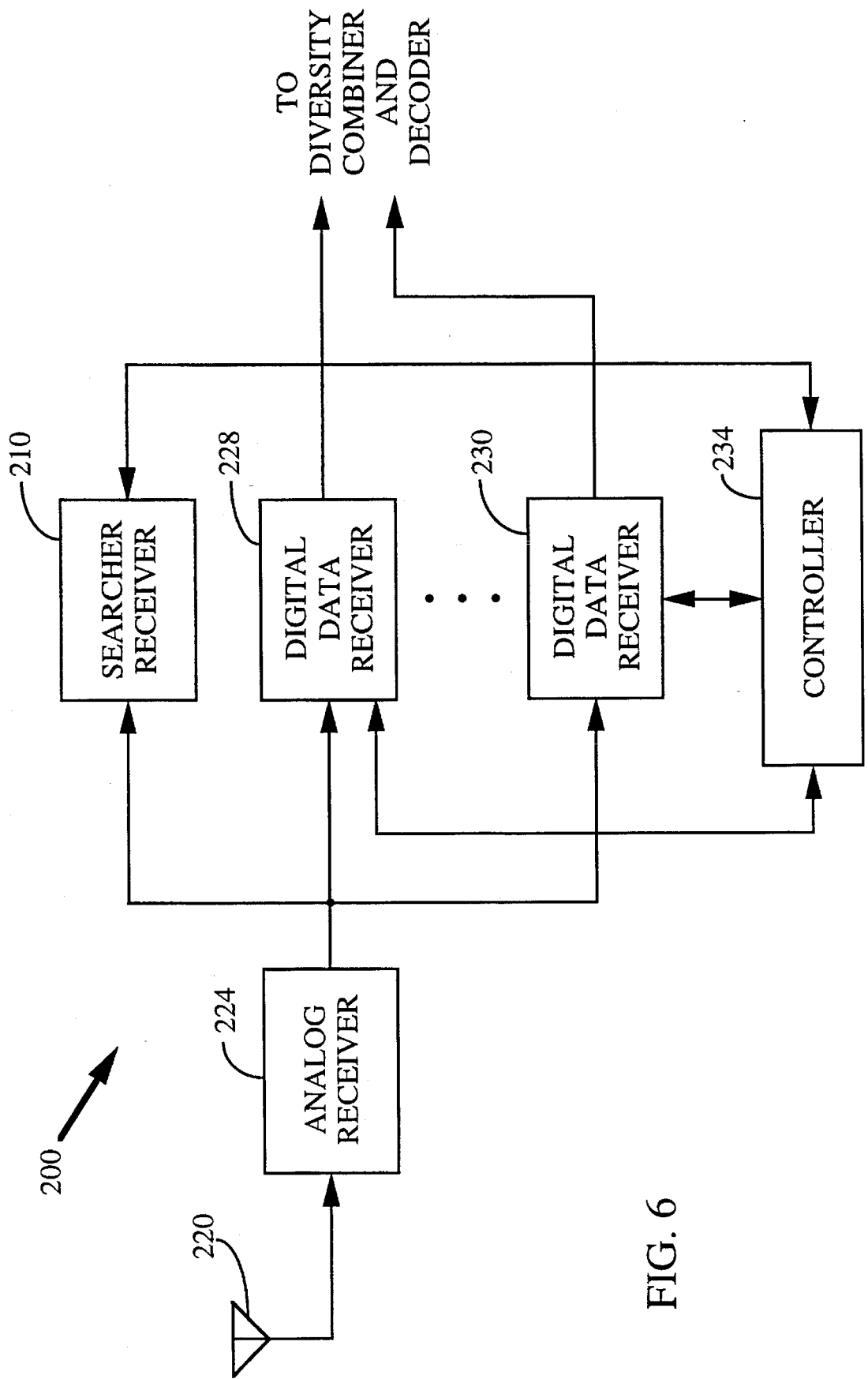
FIG. 6 shows an exemplary mobile station receiver in which may be incorporated a pilot searcher operative in accordance with the present invention.

Turning now to FIG. 6, there is shown an exemplary mobile station receiver 200 in which may be incorporated a pilot searcher receiver 210 in accordance with the present invention. The mobile station receiver 200 includes an antenna 220, which is seen to be coupled to analog receiver 224. Receiver 224 receives the RF frequency signals collected by antenna 220, which are typically in the 850 MHz frequency band, and effects amplification and frequency downconversion to an IF frequency. This frequency translation process is accomplished using a frequency synthesizer of standard design which permits the receiver 224 to be tuned to any of the frequencies within the receive frequency band of the overall cellular telephone frequency band.

The IF signal is then passed through a surface acoustic wave (SAW) bandpass filter which in the preferred embodiment is approximately 1.25 MHz in bandwidth. The characteristics of the SAW filter are chosen to match the waveform of the signal transmitted by the base station which has been direct sequence spread spectrum modulated by a PN sequence clocked at a predetermined rate, which in the preferred embodiment is 1.2288 MHz.

Receiver 224 is also provided with an analog to digital (A/D) converter (not shown) for converting the IF signal to a digital signal. The digitized signal is provided to each of three or more signal processors or data receivers, one of which is the inventive searcher receiver 210 with the remainder being data receivers. For purposes of illustration only the searcher receiver 210 and two data receivers 228 and 230 are shown in FIG. 6.

In FIG. 6, the digitized signal output from receiver 224 is provided to digital data receivers 228 and 230 and to searcher receiver 210. It should be understood that an inexpensive, low performance mobile station might have only a single data receiver while higher performance stations may have two or more, preferably a minimum of three, to allow diversity reception.

The digitized IF signal may contain the signals of many on-going calls together with the pilot carriers transmitted by base stations within the Active, Candidate, Pre-Candidate and Neighbor Sets. The function of the receivers 228 and 230 are to correlate the IF samples with the proper PN sequence. This correlation process provides a property that is well-known in the art as "processing gain" which enhances the signal-to-interference ratio of a signal matching the proper PN sequence while not enhancing other signals. The correlation output is then coherently detected using the pilot carrier offset PN sequence used for the correlation as a carrier phase reference. The result of this detection process is a sequence of encoded data symbols.

A property of the PN sequence as used in the mobile station receiver 200 is that discrimination is provided against multipath signals. When the signal arrives at the mobile receiver 200 after passing through more than one path, there will be a difference in the reception time of the signal. This reception time difference corresponds to the difference in distance divided by the speed of light. If this time difference exceeds one PN chip, 0.8138 msec. in a preferred implementation, then the correlation process will discriminate against one of the paths. The receiver 200 can choose whether to track and receive the earlier or later path. If two data receivers are provided, such as receivers 228 and 230, then two independent paths can be tracked simultaneously.

Searcher receiver 210, under the direction of control processor (i.e., controller) 234, is for continuously scanning the time domain, around the nominal time of a received pilot signal of the Active base station(s) with which the mobile station is currently in communication. As discussed above, multi-path pilot signals from the Active base station(s) and from other Candidate, Pre-Candidate and Neighbor base station transmitted pilot signals are also detected and measured. Receiver 210 may be configured to use the ratio of the received pilot energy per chip to total received spectral density, noise and signals, denoted as Ec/IO, as a measure of the pilot signal strength. Receiver 210 provides a signal strength measurement signal to controller processor 234 indicative of the pilot signal and its signal strength.

Controller 234 provides signals to digital data receivers 228 and 230 for each to process a different one of the strongest signals. Receivers 228 and 230 may process a multipath signal from a single base station or signals from two different base stations. The outputs of receivers 228 and 230 are provided to diversity combiner and decoder circuitry (not shown). The diversity combiner circuitry adjusts the timing of the two streams of received signals into alignment and adds them together. This addition process may be proceeded by multiplying the two streams by a number corresponding to the relative signal strengths of the two streams. This operation can be considered a maximal ratio diversity combiner. The resulting combined signal stream may then be decoded and provided to digital baseband circuitry.

Figure 7:
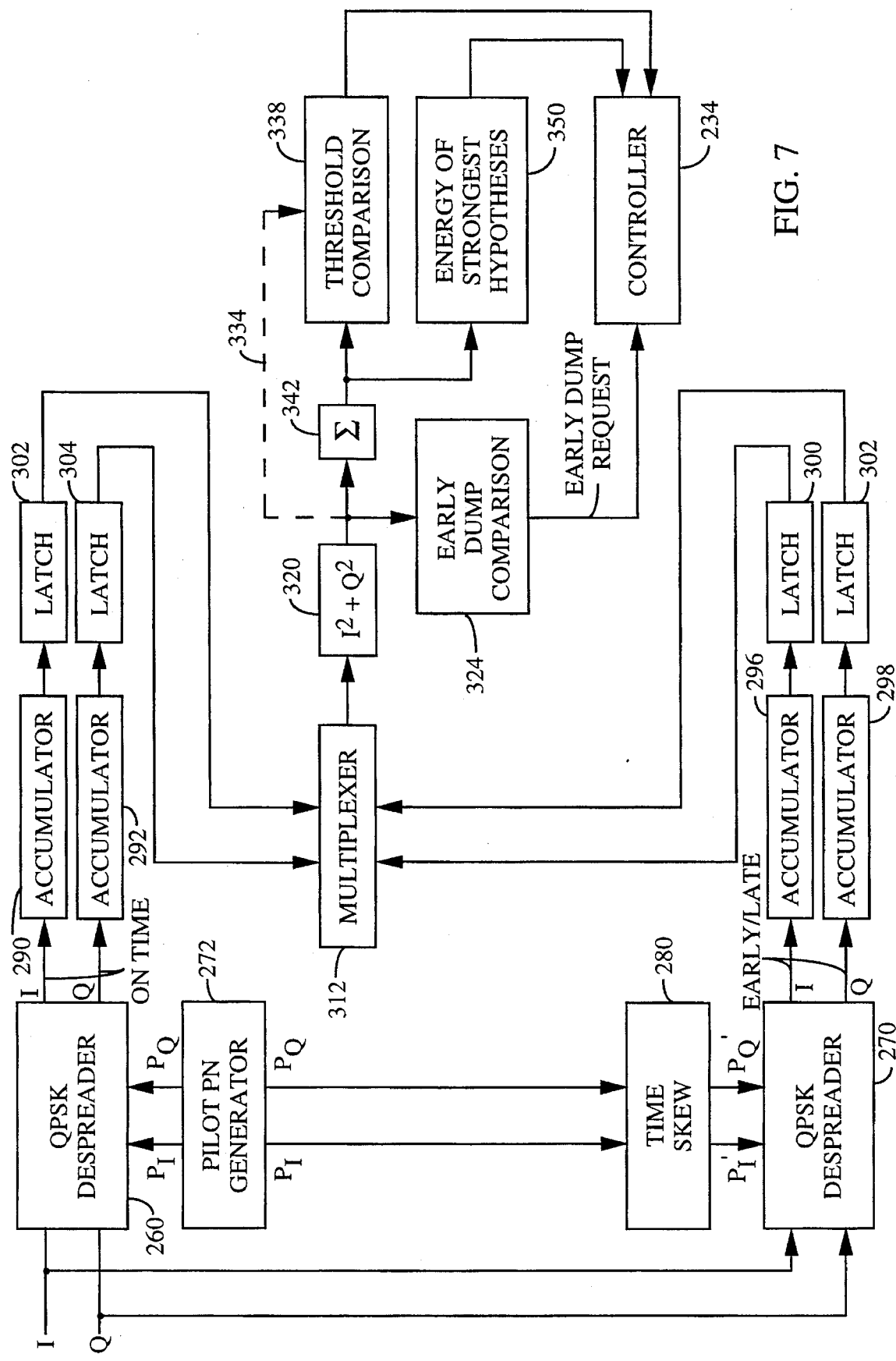
FIG. 7 depicts a block diagram of searcher receiver disposed to implement the pilot signal searching technique of the present invention.

Turning now to FIG. 7, there is shown a block diagram of searcher receiver 210. In FIG. 7, an input signal 250 from analog receiver 224 is assumed to be a Quadrature Phase Shift Keyed (QPSK) signal having inphase (I) and quadrature phase (Q) signal samples. The I and Q signal samples, each being a multiple-bit value, are input to QPSK despreaders 260 and 270. QPSK despreader 260 also receives the pilot PN sequences $PN_I$ and $PN_Q$ from pilot PN sequence generator 272. Pilot PN sequence generator 272 generates the PN sequences $PN_I$ and $PN_Q$ identical to those used in the base station according to sequence timing and state input from the mobile station controller (not shown). QPSK despreader 260 removes the PN spreading on the raw I and Q signal samples to extract uncovered I and Q component samples.

Similarly, input signal 250 having the I and Q signal samples is input to QPSK despreader 270. QPSK despreader 270 also receives the pilot PN sequences $PN_I$ and $PN_Q$ from pilot PN sequence generator 272 through time skew 280. Time skew 280 advances and delays pilot PN sequences $PN_I$ and $PN_Q$. QPSK despreader 280 removes the PN spreading on the I and Q signal samples to extract "uncovered", early/late I and Q component samples. Pilot PN sequence generator 272 receives timing information from the mobile station control processor (not shown), which serves to slew the generator 272 from one hypothesis to the next within each search window.

The search process is initiated by slewing the generator 272 to the offset associated with a given hypothesis, at which it remains for the specified number of PN chips. The "on-time" despread I and Q samples from despreader 260 are provided to a first set of accumulators 290 and 292, and the "early/late" despread I and Q samples from despreader 270 are provided to a second set of accumulators 296 and 298. The despread I and Q samples are integrated for the appropriate integration interval (e.g., 100 chips for an early dump integration) within accumulators 290, 292, 296 and 298. A first pair of latches 302, 304 and a second pair of latches 306 and 308 respectively sample the outputs of the first and second sets of accumulators 290, 292, 296 and 298 at the conclusion of each integration interval.

As is indicated by FIG. 7, a multiplexer 312 alternately passes the contents of the first and second pairs of latches to an $I^2+Q^2$ energy calculation block 320. If comparator 324 determines that the output of block 320 is less than the early dump threshold set by the mobile station control processor, then control processor advances the offset of the PN pilot signal generator 272 to the next hypothesis. In a preferred embodiment an early dump request is issued only if both of the on-time and late pilot energy levels, as respectively provided by the first pair of latches 302, 304 and by the second pair of latches 306, 308 to the $I^2+Q^2$ block 320, are both less than the early dump threshold.

If comparator 324 determines that the early dump threshold has been exceeded, then the integration operation performed by the accumulators 290, 292, 296 and 298 is continued until the conclusion of the integration interval specified by the controller 234. This result may be directly provided via signal line 334 (dashed) to digital comparator 338, and compared to the specific threshold energy level (e.g, a Pre-Candidate State transition threshold) provided by the mobile station control processor. In an alternate embodiment, accuracy may be improved by aggregating the energy from several integration passes using the same pilot hypothesis and comparing the result to an aggregate threshold. As is indicated by FIG. 7, this may be effected by accumulating within the accumulator 342 the energy from a plurality (e.g., from 2 to 7) of integration passes. After the specified number of integrations have been completed, the accumulated output from accumulator 342 is relayed to the digital comparator 338. The results of the comparison of the accumulated output to the aggregate threshold are then provided to the controller 234.

In addition, the value of the maximum aggregate energy detected from the strongest one of the hypotheses within a given search window is stored within register 350. This maximum value indicated by register 350 is provided to the controller 234 for combination with the energy values associated with, for example, the aggregated values associated with second and third hypotheses within a given search window. As discussed above, the resultant combined energy level may then be compared to a specified threshold energy level associated with transition from one to another of the Pre-Candidate States. It is understood that in this case the specified threshold energy will be predicated on the number of integration passes involved in producing the energy value stored within accumulator 342.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a cellular communication system in which a mobile user communicates through a mobile station with other users via at least one base station included in an active list of one or more base station entries, wherein each of a plurality of base stations within said system transmit a unique pilot signal, a method for identifying ones of said base stations from which received signal strength is sufficient to establish communication with said mobile station, said method comprising the steps of:

maintaining in said mobile station a candidate list of base station entries, wherein each entry in said candidate list corresponds to a base station capable of providing sufficient signal strength to establish communication with said mobile station wherein said active list of one or more base station entries is maintained within said mobile station and is derived from said candidate list of base station entries;

maintaining in said mobile station a neighbor list of base station entries, wherein each entry in said neighbor list corresponds to a base station in a predetermined proximity of said mobile station;

measuring at said mobile station signal strength of each said pilot signal transmitted by each of said base stations in said neighbor list;

comparing at said mobile station said base station signal strength measurements of each of said neighbor list entries to a first predetermined level; and removing by said mobile station a particular entry from said neighbor list having said base station signal strength measurement greater than said first predetermined level and placing said particular entry in a pre-candidate list maintained in said mobile station, wherein said entries in said pre-candidate list correspond to a set of base stations from which are derived said candidate list of base station entries.

2. The method of claim 1 wherein said step of removing said particular entry includes the steps of placing said particular entry within a first state of said pre-candidate list, said pre-candidate list having associated therewith a plurality of states other than said first state.

3. The method of claim 2 further including the steps of:

correlating, for a first predetermined time interval at said mobile station, a replica of a particular base station pilot signal corresponding to said particular entry with said particular base station pilot signal received at said mobile station; and removing from said first state and placing within a second state of said pre-candidate list said particular entry based on a result of said step of correlating.

4. The method of claim 3 further including the steps of:

correlating, for a second predetermined time interval at said mobile station, a replica of said particular base station pilot signal corresponding to said particular entry with said particular base station pilot signal received at said mobile station; and removing from said second state and placing within a third state of said pre-candidate list said particular entry based on a result of said step of correlating performed during said second predetermined time interval.

5. The method of claim 4 further including the steps of:

correlating, for a third predetermined time interval at said mobile station, a replica of said particular base station pilot signal corresponding to said particular entry with said particular base station pilot signal received at said mobile station; and removing from said third state and placing within said candidate list said particular entry based on a result of said step of correlating performed during said third predetermined time interval.

6. The method of claim 2 further including the steps of:

correlating, for one or more predetermined time intervals at said mobile station, a replica of a particular base station pilot signal corresponding to said particular entry with said particular base station pilot signal received at said mobile station; and removing from said first state and returning to said neighbor list said particular entry based on a result of said step of correlating performed during said one or more predetermined time intervals.

7. In a code division multiple access (CDMA) spread spectrum cellular communication system in which a mobile user communicates through a mobile station with other users via at least one base station included in an active list of one more base station entries, wherein each of a plurality of base stations within said system transmit a pilot PN code signal of a unique phase, each of said PN code signals including a predefined sequence of PN chips, a method for identifying ones of said base stations from which received signal strength is sufficient to establish communication with said mobile station, said method comprising the steps of:

maintaining in said mobile station a candidate list of base station entries, wherein each entry in said candidate list corresponds to a base station capable of providing sufficient signal strength to establish communication with said mobile station wherein said active list of one or more base station entries is maintained within said mobile station and is derived from said candidate list of base station entries;

maintaining in said mobile station a neighbor list of base station entries, wherein each entry in said neighbor list corresponds to a base station in a predetermined proximity of said mobile station;

measuring at said mobile station signal strength of each said pilot PN code signal transmitted by each of said base stations in said neighbor list;

comparing at said mobile station said base station signal strength measurements of each of said neighbor list entries to a first predetermined level; and removing by said mobile station a particular entry from said neighbor list having said base station signal strength measurement greater than said first predetermined level and placing said particular entry in a pre-candidate list maintained in said mobile station, wherein said entries in said precandidate list correspond to a set of base stations from which are derived said candidate list of base station entries.

8. The method of claim 7 wherein when said particular entry is placed within said pre-candidate list it is placed in a first state of said pre-candidate list, the method further including the steps of:

correlating, over a first predetermined number of said PN chips, a replica of a particular base station pilot PN code signal corresponding to said particular entry with said particular base station pilot PN code signal received at said mobile station; and removing from a first state and placing within a second state of said pre-candidate list said particular entry based on a result of said step of correlating.

9. The method of claim 8 further including the steps of:

correlating, over a second predetermined number of said PN chips, said replica of said particular base station pilot PN code signal corresponding to said particular entry with said particular base station pilot PN code signal received at said mobile station; and removing from said second state and placing within a third state of said pre-candidate list said particular entry based on a result of said step of correlating performed over said second predetermined number of said PN chips.

10. The method of claim 9 further including the steps of:

correlating, over a third predetermined number of said PN chips, said replica of the base station pilot PN code signal corresponding to said particular entry with said particular base station pilot PN code signal received at said mobile station; and removing from said third state and placing within said candidate list said particular entry based on a result of said step of correlating performed over said third predetermined number of said PN chips.

11. The method of claim 7 further including the steps of:

correlating, over one or more predetermined numbers of said PN chips, a replica of a base station pilot PN code signal corresponding to said particular entry with said particular base station pilot PN code signal received at said mobile station; and removing from a first state of said pre-candidate list and placing within said neighbor list said particular entry based on a result of said step of correlating over said one or more predetermined numbers of said PN chips.

12. The method of claim 8 wherein said step of correlating further includes the steps of:

defining a time window about an expected time of arrival at said mobile station of said particular base station pilot PN code signal; and despreading, at multiple time offsets within said time window, said particular base station pilot PN code signal received at said mobile station with said replica of said particular base station pilot PN code signal; and integrating each result of said step of despreading over said first predetermined number of said PN chips.

13. The method of claim 12 further including the steps of:

averaging a selected number of results of said step of integrating;

comparing a result of said step of averaging to a predefined threshold; and whereas said particular entry of said pre-candidate list is removed from said first state and placed within a second state of said pre-candidate list if the result of said step of averaging exceeds said predefined threshold.

14. The method of claim 8 wherein said step of correlating further includes the steps of:

defining a time window about an expected time of arrival at said mobile station of said particular base station pilot PN code signal;

performing an early dump integration, at a first time offset within said time window, of said base station pilot PN code signal replica with said particular base station pilot PN code signal received at said mobile station, said early dump integration being performed at said first time offset over a preselected number of said PN chips;

comparing a result of said early dump integration performed at said first time offset to an early dump threshold; and whereas said particular entry of said pre-candidate list is removed from said neighbor list and placed within said first state of said pre-candidate list if the result of said step of performing an early dump integration at said first time offset exceeds said early dump threshold.

15. The method of claim 14 further including the step of continuing integration, over a second predetermined number of said PN chips, of said base station pilot PN code signal replica with said particular base station pilot PN code signal; and removing said particular entry from said first state of said pre-candidate list and placing said particular entry within a second state of pre-candidate list if a result of said step of continuing integration over said second predetermined number of said PN code chips exceeds a second threshold.

16. In a cellular communication system in which a mobile user communicates through a mobile station with other users via at least one base station included in an active list of one or more base station entries, wherein each of a plurality of base stations within said system transmit a unique pilot signal, a searcher apparatus disposed within said mobile station for identifying ones of said base stations from which received signal strength is sufficient to establish communication with said mobile station, said searcher apparatus comprising:

a mobile station controller for maintaining a candidate list of base station entries, wherein each entry in said candidate list corresponds to a base station capable of providing sufficient signal strength to establish communication with said mobile station wherein said active list of one or more base station entries is stored within said mobile station and is derived from said candidate list of base station entries; said mobile station controller further maintaining a neighbor list of base station entries, wherein each entry in said neighbor list corresponds to a base station in a predetermined proximity of said mobile station;

a pilot signal measurement circuit for measuring signal strength of each said pilot signal transmitted by each of said base stations in said neighbor list;

a comparison circuit for comparing said base station signal strength measurements of each of said neighbor list entries to a first predetermined level;

wherein said mobile station controller removes a particular entry from said neighbor list having said base station signal strength measurement greater than said first predetermined level and places said particular entry in a pre-candidate list maintained within said mobile station, said entries in said pre-candidate list corresponding to a set of base stations from which are derived said candidate list of base station entries.

17. The apparatus of claim 16 wherein said mobile station controller includes means for placing said particular entry within a first state of said pre-candidate list, said pre-candidate list having associated therewith a plurality of states other than said first state.

18. The apparatus of claim 17 further including a correlator for producing a correlation result by correlating, during a first predetermined time interval at said mobile station, a replica of a particular base station pilot signal corresponding to said particular entry with said particular base station pilot signal received at said mobile station wherein said mobile station controller further includes means for removing from said first state and placing within a second state of said pre-candidate list said particular entry based on said correlation result.

19. The apparatus of claim 18 wherein said correlator is further for producing a second correlation result by correlating, for a second predetermined time interval at said mobile station, said replica of said particular base station pilot signal corresponding to said particular entry with said particular base station pilot signal received at said mobile station, and wherein said mobile station controller further includes means for removing from said second state and placing within a third state of said pre-candidate list said particular entry based on said second correlation result.

20. The apparatus of claim 19 wherein said correlator is further for producing a third correlation result by correlating, for a third predetermined time interval at said mobile station, said replica of said particular base station pilot signal corresponding to said particular entry with said particular base station pilot signal received at said mobile station, and wherein said mobile station controller further includes means for removing from said third state and placing within said candidate list said particular entry based on said third correlation result.

21. The apparatus of claim 19 wherein said correlator is further for correlating, for one or more other predetermined time intervals at said mobile station, said replica of said particular base station pilot signal corresponding to said particular entry with said particular base station pilot signal received at said mobile station, and wherein said mobile station controller further includes means for removing from said first state and returning to said neighbor list said particular entry based on a result of said correlator correlating during said one or more other predetermined time intervals.

22. In a code division multiple access (CDMA) spread spectrum cellular communication system in which a mobile user communicates through a mobile station with other users via at least one base station included in an active list of one or more base station entries, wherein each of a plurality of base stations within said system transmit a pilot PN code signal of a unique phase, each of said PN code signals including a predefined sequence of PN chips, a mobile station searcher apparatus for identifying ones of said base stations from which received signal strength is sufficient to establish communication with said mobile station, said apparatus comprising:

a mobile station controller for maintaining a candidate list of base station entries, wherein each entry in said candidate list corresponds to a base station capable of providing sufficient signal strength to establish communication with said mobile station wherein said active list of one or more base station entries is stored within said mobile station and is derived from said candidate list of base station entries said mobile station controller further maintaining a neighbor list of base station entries, wherein each entry in said candidate list corresponds to a base station in a predetermined proximity of said mobile station;

a pilot signal measurement circuit for measuring at said mobile station signal strength of each said pilot PN code signal transmitted by each of said base stations in said neighbor list;

a comparison circuit for comparing at said mobile station said base station signal strength measurements of each of said neighbor list entries to a first predetermined level;

wherein said mobile station controller for removes a particular entry from said neighbor list having said base station signal strength measurement greater than said first predetermined level and places said particular entry in a pre-candidate list maintained within said mobile station, said entries in said pre-candidate list corresponding to a set of base stations from which are derived said candidate list of base station entries.

23. The apparatus of claim 22 further including a correlator for producing a first correlation result by correlating, over a first predetermined number of said PN chips, a replica of the base station pilot PN code signal corresponding to said particular entry with said particular base station pilot PN code signal received at said mobile station wherein said mobile station controller includes means for removing from said first state and placing within a second state of said pre-candidate list said particular entry based on said first correlation result.

24. The apparatus of claim 23 further including means for producing a first integration result by integrating, over a second predetermined number of said PN chips, said replica of the base station pilot PN code signal corresponding to said particular entry with said particular base station pilot PN code signal received at said mobile station, and wherein said mobile station controller includes means for removing from said second state and placing within a third state of said pre-candidate list said particular entry based on said first integration result.

25. The apparatus of claim 23 further including means for producing an integration result by integrating, over one or more other predetermined numbers of said PN chips, said replica of the base station pilot PN code signal corresponding to said particular entry with said particular base station pilot PN code signal received at said mobile station, and wherein said mobile station controller includes means for removing from said first state and placing within said neighbor list said particular entry if said integration result is less than a predefined threshold.

26. The apparatus of claim 24 further including means for producing a second integration result by integrating, over a third predetermined number of said PN chips, said replica of the base station pilot PN code signal corresponding to said particular entry with said particular base station pilot PN code signal received at said mobile station, and wherein said mobile station controller further includes means for removing from said third state and placing within said candidate list said particular entry if said second integration result exceeds a predefined threshold.

27. The apparatus of claim 24 further including means for defining a time window about an expected time of arrival at said mobile station of said particular base station pilot PN code signal.

28. The apparatus of claim 26 wherein said correlator is operative to integrate, over said first predetermined number of said PN chips and at multiple time offsets within said time window, said base station pilot PN code signal replica with said particular base station pilot PN code signal received at said mobile station.

29. The apparatus of claim 28 further including:

means for averaging the results of a selected number of integrations performed during said time window;

a comparator for comparing the average of the results to a predefined threshold; and wherein said mobile station controller includes means for removing from said first state and placing within a second state of said pre-candidate list said particular entry based on the result produced by said comparator.

30. The apparatus of claim 23 further including:

means for defining a time window about an expected time of arrival at said mobile station of said particular base station pilot PN code signal, said correlator including means for performing an early dump integration, at a first time offset within said time window, of said base station pilot PN code signal replica with said particular base station pilot PN code signal received at said mobile station, said early dump integration being performed at said first time offset over a preselected number of said PN chips;

a comparator for comparing the results of said early dump integration at said first time offset to an early dump threshold; and wherein said mobile station controller includes means for removing from said neighbor list and placing within a first state of said pre-candidate list said particular entry if the result of said early dump integration performed at said first time offset exceeds said early dump threshold.

31. The apparatus of claim 30 wherein said correlator includes means for producing a continued integration result by continuing integration, over a second predetermined number of said PN code chips, of said base station pilot PN code signal replica with said particular base station pilot PN code signal, and wherein said mobile station controller includes means for removing said particular entry from said first state of said pre-candidate list and placing said particular entry within a second state of pre-candidate list if said continued integration result exceeds a second threshold.

32. In a cellular communication system in which a mobile user communicates through a mobile station with other users via at least one base station included in an active list of one or more base station entries, wherein each of a plurality of base stations within said system transmit a unique pilot signal, a method for identifying ones of said base stations from which received signal strength is sufficient to establish communication with said mobile station, said method comprising the steps of:

- maintaining in said mobile station a candidate list of base station entries, wherein each entry in said candidate list corresponds to a base station capable of providing sufficient signal strength to establish communication with said mobile station wherein said active list of one or more base station entries is maintained within said mobile station and is derived from said candidate list of base station entries;

- maintaining in said mobile station a neighbor list of base station entries, wherein each entry in said neighbor list corresponds to a base station in a predetermined proximity of said mobile station;

- measuring at said mobile station signal strength of each said pilot signal transmitted by each of said base stations in said neighbor list;

- comparing at said mobile station said base station signal strength measurements of each of said neighbor list entries to a first predetermined level; and

- placing a particular entry from said neighbor list having said base station signal strength measurement greater than said first predetermined level in a pre-candidate list maintained in said mobile station, wherein said entries in said pre-candidate list correspond to a set of base stations from which are derived said candidate list of base station entries.

33. The method of claim 32 wherein said step of placing includes the step of introducing said particular entry into a first state of said pre-candidate list, said pre-candidate list having associated therewith a plurality of states other than said first state.

34. The method of claim 33 further including the steps of:

- correlating, for a first predetermined time interval at said mobile station, a replica of a particular base station pilot signal corresponding to said particular entry with said particular base station pilot signal received at said mobile station; and

- removing from said first state and placing within a second state of said pre-candidate list said particular entry based on a result of said step of correlating.

35. The method of claim 34 further including the steps of:

- correlating, for a second predetermined time interval at said mobile station, a replica of said particular base station pilot signal corresponding to said particular entry with said particular base station pilot signal received at said mobile station; and

- removing from said second state and placing within a third state of said pre-candidate list said particular entry based on a result of said step of correlating performed during said second predetermined time interval.

36. The method of claim 35 further including the steps of:

- correlating, for a third predetermined time interval at said mobile station, a replica of said particular base station pilot signal corresponding to said particular entry with said particular base station pilot signal received at said mobile station; and

- removing from said third state and placing within said candidate list said particular entry based on a result of said step of correlating performed during said third predetermined time interval.

* * * * *